United States Patent
Kishore et al.

(10) Patent No.: US 10,757,210 B2
(45) Date of Patent: Aug. 25, 2020

(54) SYSTEM AND A METHOD OF DIRECT COMMUNICATION AND ENGAGEMENT WITHIN AN ORGANIZATION

(71) Applicant: Zensar Technologies Limited, Pune, Maharashtra (IN)

(72) Inventors: Sandeep Kishore, Fremont, CA (US);
Priya Anirudha Tikhe, Maharashtra (IN); Mukti Anand Wagh, Assam (IN); Sarath Regulagadda Asi, Maharashtra (IN); Mukund Narasimhan, Maharashtra (IN)

(73) Assignee: ZENSAR TECHNOLOGIES LTD., Maharashtra (IN)

( * ) Notice: Subject to any disclaimer, the term of this patent is extended or adjusted under 35 U.S.C. 154(b) by 424 days.

(21) Appl. No.: 15/202,972

(22) Filed: Jul. 6, 2016

(65) Prior Publication Data

US 2017/0302600 A1    Oct. 19, 2017

(30) Foreign Application Priority Data

Apr. 14, 2016   (IN) .............................. 201621013160

(51) Int. Cl.
*G06F 15/16*        (2006.01)
*H04L 29/08*        (2006.01)
(Continued)

(52) U.S. Cl.
CPC .............. *H04L 67/26* (2013.01); *H04L 51/02* (2013.01); *H04L 63/104* (2013.01); *H04W 4/06* (2013.01);
(Continued)

(58) Field of Classification Search
CPC ......... H04L 51/04; H04L 67/26; H04L 51/02; H04L 51/046; H04L 63/104; H04W 12/08; H04W 12/0806; H04W 4/06
See application file for complete search history.

(56) References Cited

U.S. PATENT DOCUMENTS 6,901,394 B2 *   5/2005   Chauhan ................ G06N 5/022
                                                          706/46
9,160,550 B1    10/2015   Morrison
(Continued)

FOREIGN PATENT DOCUMENTS

| CN | 103746826 A | * | 4/2014 | ............ H04L 12/24 |
| WO | 2001039017 A1 | | 5/2001 | |
| WO | 2005098608 A2 | | 12/2005 | |

OTHER PUBLICATIONS

Zhang Ming, Ma Lili, Method for automatically detecting and identifying operating systems of host computers in network, Apr. 23, 2014, English Tramslation of CN103746826A (Two documents).*

(Continued)

*Primary Examiner* — Chris Parry
*Assistant Examiner* — Dixon F Dabipi
(74) *Attorney, Agent, or Firm* — Hamre, Schumann, Mueller & Larson, P.C.

(57) ABSTRACT

The present disclosure relates to the field of direct communication and engagement within organization. In the modern scenario, there is an inherent need for the organization to provide information requested by its employees via direct electronic communication. The number of employees requesting information is usually much larger as compared to the number of management personnel equipped to provide the requested information and the companies are, thus, at a disadvantage in their ability to provide information to their employees. Therefore, there is a need for a system of direct (Continued)

electronic communication that enables organizations to provide information requested by individual employees, identify resources within the organization capable of providing the requested information, and route queries to the best available resource. The present disclosure provides a system and method that, enables management personnel to answer queries of the employees, and ensures easy exchange of information and ideas within the organization.

18 Claims, 3 Drawing Sheets

(51) Int. Cl.
    *H04L 29/06*     (2006.01)
    *H04L 12/58*     (2006.01)
    *H04W 4/06*     (2009.01)
    *H04W 12/08*     (2009.01)

(52) U.S. Cl.
    CPC ....... *H04W 12/0806* (2019.01); *H04L 51/046* (2013.01)

(56) References Cited

U.S. PATENT DOCUMENTS

| | | | |
|---|---|---|---|
| 9,497,243 B1* | 11/2016 | Binns | H04L 65/602 |
| 2006/0288099 A1* | 12/2006 | Jefferson | H04L 29/06027 709/224 |
| 2007/0143824 A1* | 6/2007 | Shahbazi | H04L 63/083 726/1 |
| 2008/0077416 A1* | 3/2008 | Hetrick | G06Q 10/06 705/300 |
| 2009/0325609 A1* | 12/2009 | Rosen | H04L 51/36 455/466 |
| 2009/0327423 A1* | 12/2009 | Puschkin | G06Q 10/10 709/205 |
| 2010/0191554 A1* | 7/2010 | Singh | G06Q 10/063 705/7.11 |
| 2013/0086225 A1* | 4/2013 | Gay | G06Q 10/10 709/219 |
| 2014/0018033 A1* | 1/2014 | Luna | H04W 28/0215 455/405 |
| 2015/0117373 A1* | 4/2015 | Thies | H04W 72/0493 370/329 |
| 2016/0094490 A1 | 3/2016 | Li | |
| 2016/0299725 A1* | 10/2016 | Hosoda | H04W 12/08 |
| 2018/0204111 A1* | 7/2018 | Zadeh | G06N 3/0436 |
| 2018/0268298 A1* | 9/2018 | Johansen | G06N 3/0454 |
| 2019/0206521 A1* | 7/2019 | Walpole | G06N 3/08 |

OTHER PUBLICATIONS

APPrise Mobile, "theEMPLOYEEapp" online (http://www.thecommsapp.com/whatisthecommsapp/whatistheemployeeapp) accessed Apr. 30, 2016, 5 pages.

Slack, "Team communication for the 21st century." online (https://slack.com/is) accessed May 2, 2016, 6 pages.

* cited by examiner

SYSTEM AND A METHOD OF DIRECT COMMUNICATION AND ENGAGEMENT WITHIN AN ORGANIZATION

FIELD

The present disclosure relates to the field of direct communication and engagement within organization.

BACKGROUND

Several forms of electronic communication have arisen to satisfy the need for direct and indirect communications. As communication methods have evolved, so have the ways in which information may be acquired. In the modern scenario, there is an inherent need for the organization to provide information requested by its employees via direct electronic communication. The number of employees requesting information is usually much larger as compared to the number of management personnel equipped to provide the requested information and the companies are, thus, at a disadvantage in their ability to provide information to their employees.

There is, therefore, felt a need for a system of direct electronic communication that enables organizations to provide information requested by individual employees, identify resources within the organization capable of providing the requested information, and route queries to the best available resource.

OBJECTS

Some of the objects of the present disclosure, which at least one embodiment herein satisfies, are as follows:

It is an object of the present disclosure to ameliorate one or more problems of the prior art or to at least provide a useful alternative.

Another object of the present disclosure is to provide a system and a method of direct communication and engagement within an organization.

Yet another object of the present disclosure is to provide a system and a method of direct communication and engagement within an organization which enables the organization to provide its information requested by its employees.

Still another object of the present disclosure is to provide a system and a method of direct communication and engagement within an organization which enables easy exchange of information and ideas between the management and the employees of the organization.

Other objects and advantages of the present disclosure will be more apparent from the following description, which is not intended to limit the scope of the present disclosure.

SUMMARY

The present disclosure envisages a system for direct communication and engagement within an organization. The system comprises a plurality of end user devices, an active directory, at least one moderating device, at least one data server, at least one repository and an adaptive learning system. The plurality of end user devices are configured to facilitate communication of information between end users of the organization, the information including at least one of a plurality of queries and at least one response to each of the plurality of queries. The active directory is configured to store authorization information related to each of the plurality of end user devices. The at least one moderating device cooperate with the plurality of end user devices and is configured to receive the information from the plurality of end user devices, and further is configured to sanitize and filter the information to obtain moderated information. The at least one data server cooperates with the at least one moderating device and the active directory to receive the moderated information and the authorization information respectively, the at least one data server is configured to associate the moderated information with the authorization information to obtain processed information, and provide access of the processed information to the plurality of end user devices based on the associated authorization information. The at least one repository cooperates with the at least one data server and is configured to store the processed information. The adaptive learning system cooperates with the at least one data server, and the at least one repository, and is configured to
- receive the moderated information from the at least one data server, and extract the at least one query from the moderated information,
- receive the processed information from the at least one repository and extract at least one query from the processed information,
- compare the at least one query of the moderated information and the at least one query of the processed information, and
- based on the result of the comparison, send a recommendation signal to the at least one data server.

In one embodiment, the plurality of end user devices are selected from a group of electronic communication devices including personal computers, PDAs, mobile tablets, smart phones, and the like. In another embodiment, each of the plurality of end user devices is configured to interact with the at least one data server over at least one network.

In yet another embodiment, each of the plurality of end user devices includes a user media module, a user engagement platform, a dashboard, a user push notification module, and a user authentication module, and the at least one data server includes a server media module, a server engagement platform, an analytics module, a server push notification module, and a server authentication module.

Further, in an embodiment, the server media module is configured to deliver media content, including a plurality of audio formats, a plurality of video formats, and a plurality of graphic/image formats, over a content delivery network (CDN), and the user media module is configured to play/display media content received over the content delivery network (CDN) from the server media module. The content delivery network (CDN) provides content repositories, delivery services, security of content, and smart streaming based on internet bandwidth and types of devices. In one embodiment, the server engagement platform is configured to interact with the user engagement platform to provide functionalities which include
- posting questions and answers by the means of text/typed communication, and/or voice message, and/or images,
- liking questions and answers,
- commenting on questions and answers,
- redirecting questions to departments,
- re-opening questions, task management and
- providing dashboard computations.

In yet another embodiment, the analytics module is configured to publish server interfaces for the dashboard, aggregate and analyze for engagement, usage and sentiment of, the data received from the server engagement platform and the server media module, and create datasets to be sent to the dashboard of each of the plurality of end user devices, and the dashboard is configured to interface with the at least one data server to fetch data to be displayed on the user engagement platform.

In one embodiment, the system includes cloud notification services (CNS) configured to provide an interface between the user push notification module and the server push notification module, wherein the cloud notification services (CNS) include Apple Push Notification Service (APNS) and Google Cloud Messaging (GCM). The user push notification module is configured to receive a device token from the cloud notification services (CNS), send the token to the server push notification module along with a user ID to bind the plurality of end user devices, and handle multiple tasks to be performed on receipt of a push notification. The e server push notification module is configured to identify devices from the plurality of end user devices to which notifications are to be sent, identify the operating system of each of the plurality of end user devices, and send a push notification to the user push notification module of the identified devices.

In another embodiment, the user authentication module is configured to facilitate log-in of the end users of the organization, using authorization information provided to each of the end users by the organization, and further configured to send the authorization information, entered by the end users into each of the plurality of end user devices, to the server authentication module. The server authentication module is configured to interface with the active directory using internet protocols, retrieve the authorization information of the plurality of end user devices from the active directory, verify the authorization information corresponding to each of the plurality of end user devices, identify whether each of the plurality of end user devices is registered to an employee, CEO or a department head of one of the departments, based on their authorization information, and provide a role identifier to each of the plurality of end user devices.

Further, based on the role identifier, the analytics module is configured to filter datasets to be sent to the dashboard of each of the plurality of end user devices, the server push notification module is configured to selectively send notifications to the user push notification module, and the server engagement platform is configured to provide only authorized functionalities to the user engagement platform of each of the plurality of end user devices.

Furthermore, in one embodiment, the at least one data server includes a visibility filter cooperating with the server authentication module and connected between the user engagement platform and the server engagement platform, the visibility filter configured to include predefined rules for data privacy within the organization, and further configured to provide options to the end users for selecting from a plurality of privacy settings for the data posted from the plurality of end user devices. In an embodiment, the visibility filter is configured to receive data from the user engagement platform and mark the received data with a default visibility flag using the predefined rules and the role identifier of each of the plurality of end user devices. In another embodiment, the visibility filter is configured to receive data from the user engagement platform and mark the received data with a visibility flag corresponding to a privacy setting chosen, from the plurality of privacy settings, by each of the plurality of end user devices.

In an embodiment, the adaptive learning system is optimized and automated, the adaptive learning system includes a comparator configured to compare the at least one query of the moderated information and the at least one query of the processed information, a decision making unit cooperating with the comparator to receive the result of the comparison and configured to decide response to be given based on the result of the comparison, and a recommendation unit cooperating with the decision making unit to receive a decided response and configured to provide the recommendation signal to the at least one data server based on the decided response, the recommendation signal includes a recommended response that is configured to prevent contradictory responses to the at least one query of the moderated information. Further, in another embodiment, the adaptive learning system is configured to provide a sentiment analysis of data received from the plurality of end user devices. Furthermore, in yet another embodiment the adaptive learning system is a closed loop data processing system based on at least one of fuzzy logic and neural networks.

In an embodiment, the at least one data server includes a translator configured to translate data received from the plurality of end user devices, in a plurality of languages.

The present disclosure further envisages a method for direct communication and engagement within an organization. The method comprises the following steps:
- facilitating communication of information between end users of the organization by using a plurality of end user devices, the information including at least one of a plurality of queries and at least one response to each of the plurality of queries;
- storing authorization information related to each of the plurality of end user devices in an active directory;
- receiving, sanitizing and filtering, by using at least one moderating device, the information received from the plurality of end user devices, to obtain moderated information;
- receiving the moderated information and the authorization information, associating the moderated information with the authorization information to obtain processed information by using at least one data server, and providing access of the processed information to the plurality of end user devices based on the association;
- storing the processed information using at least one repository;
- receiving the moderated information and extracting the at least one query from the moderated information by using an adaptive learning system;
- receiving the processed information and extracting at least one query from the processed information by using an adaptive learning system; and
- comparing the at least one query of the moderated information and the at least one query of the processed information, and sending a recommendation signal to the at least one data server based on the result of the comparison by using an adaptive learning system.

BRIEF DESCRIPTION OF THE ACCOMPANYING DRAWING

The system and method of the present disclosure will now be described with the help of the accompanying drawing, in which.

DETAILED DESCRIPTION

Several forms of electronic communication have arisen to satisfy the need for direct and indirect communications. As communication methods have evolved, so have the ways in which information may be acquired. In the modern scenario, there is an inherent need for the organization to provide information requested by its employees via direct electronic communication. The number of employees requesting information is usually much larger as compared to the number of management personnel equipped to provide the requested information and the companies are, thus, at a disadvantage in their ability to provide information to its employees. There is, therefore, felt a need for a system of direct electronic communication that enables organizations to provide information requested by individual employees, identify resources within the organization capable of providing the requested information, and route queries to the best available resource.

Figure 1:
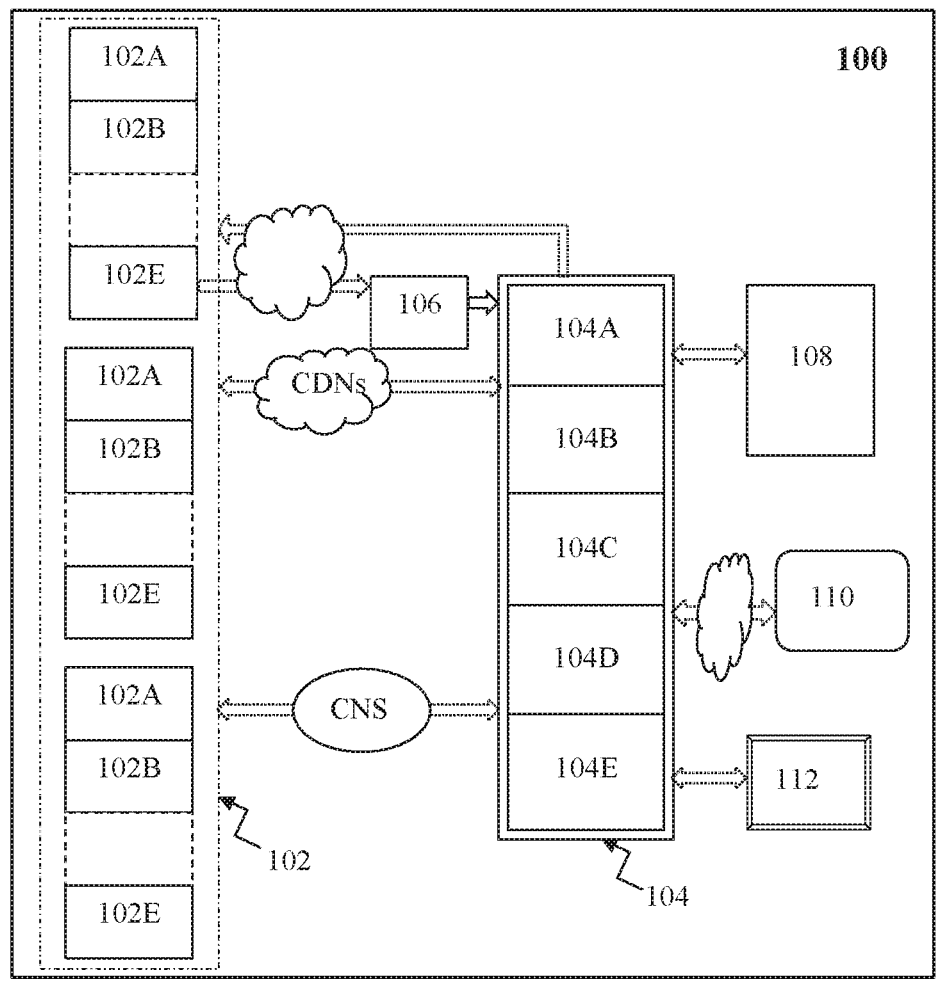
FIG. 1 illustrates a schematic block diagram of a system of direct communication and engagement, in accordance with an embodiment of the present disclosure.

FIG. 1 illustrates a schematic block diagram of a system of direct communication and engagement, in accordance with an embodiment of the present disclosure. The system 100 comprises a plurality of end user devices 102, at least one data server 104, at least one moderating device 106, an adaptive learning system 108, an active directory 110, and at least one repository 112.

In an embodiment, the plurality of end user devices 102 includes electronic communication devices of the end users from the organization viz. employees of the organization, departments of the organization and the CEO of the organization. In an embodiment, the plurality of end user devices 102 may be selected from the group of electronic communication devices comprising personal computers, PDAs, mobile tablets, smart phones, or combinations thereof. Each of the plurality of end user devices 102 is configured to facilitate communication of information between end users of the organization. In one embodiment, the information includes at least one of a plurality of queries and at least one response to each of the plurality of queries. The end user devices 102 are configured to interact with the at least one data server 104 over multiple networks for exchange of information.

The active directory 110 is configured to store authorization information related to each of the plurality of end user devices 102. In an embodiment, the active directory 110 is accessed by an internet protocol. In another embodiment, the internet protocol is a Lightweight Directory Access Protocol (LDAP).

The at least one moderating device 106 is connected between the plurality of end user devices 102 of the employees of the organization and the at least one data server 104. The at least one moderating device 106 is configured to receive the information from the plurality of end user devices 102 and is further configured to sanitize and filter the received information to obtain moderated information. In one embodiment, the at least one moderating device 106 is a digital signal processor (DSP).

The at least one data server 104 is configured to inter-alia receive moderated information from the at least one moderating device 106, and authorization information from the active directory 110. The at least one data server 104 further associates the moderated information with the authorization information to obtain processed information, and provides access of the processed information to the plurality of end user devices 102 based on the associated authorization information.

The at least one repository 112 cooperates with the at least one data server 104 and is configured to store the processed information received from the at least one data server 104. In an embodiment, each of the plurality of end user devices 102 includes an inbuilt repository for storing the application data of the plurality of end user devices 102. In another embodiment, the at least one repository 112 may be MySQL database and the inbuilt repository may be SQLite database.

The adaptive learning system 108 cooperates with the at least one data server 104, and the at least one repository 112, and is configured to
- receive the moderated information from the at least one data server 104, and extract the at least one query from the moderated information,
- receive the processed information from the at least one repository 112 and extract at least one query from the processed information,
- compare the at least one query of the moderated information and the at least one query of the processed information, and
- based on the result of the comparison, send a recommendation signal to the at least one data server 104.

In an embodiment, each of the plurality of end user devices 102 includes a user media module 102A, a user engagement platform 102B, a dashboard 102C, a user push notification module 102D, and a user authentication module 102E. In another embodiment, the at least one data server 104 includes a server media module 104A, a server engagement platform 104B, an analytics module 104C, a server push notification module 104D, and a server authentication module 104E.

The server media module 104A is configured to deliver media content over a content delivery network (CDN) and the user media module 102A is configured to play/display media content received over the content delivery network from the server media module 104A. In an embodiment, the media content may include a plurality of audio formats, a plurality of video formats, and a plurality of graphic (image) formats. In another embodiment, the content delivery network (CDN) provides content repositories and delivery services. In yet another embodiment, the content delivery networks are optimized for the following media delivery parameters:
- security of content, and
- smart streaming based on internet bandwidth and types of devices.

The server engagement platform 104B is configured to interact with the user engagement platform 102B and inter-alia provides the following functionalities:
- post questions and answers,
- like questions and answers,
- comment on questions and answers,
- redirect questions to departments,
- re-open questions, and
- manage tasks.

In an embodiment, the functionality of posting questions and answers may be provided by the means of text (typed communication), or voice message, or images, or combinations thereof. The server engagement platform 104B can provide an additional functionality of dashboard computations for requests by department(s).

The dashboard 102C is configured to interface with the at least one data server 104 to fetch data to be displayed, in a graphical KPI view, on the user engagement platform 102B.

In an embodiment, the analytics module 104C is configured to
- publish server interfaces for the dashboard 102C,
- aggregate and analyze for engagement, usage & sentiment analysis of, the data received from the server engagement platform 104B and the server media module 104A, and
- create datasets to be sent to the dashboard 102C of each of the plurality of end user devices 102.

The user push notification module 102D and the server push notification module 104D are configured to interface over cloud notification services (CNS). In an embodiment, the cloud notification services (CNS) include Apple Push Notification Service (APNS) and Google Cloud Messaging (GCM).

In another embodiment, the user push notification module 102D is configured to:
- receive a device token from the cloud notification services (CNS),
- send the token to the server push notification module 104D of the server along with a user ID to bind the plurality of end user devices 102, and
- handle multiple tasks to be performed after the push notification is received.

In one embodiment, the server push notification module 104D is configured to:
- identify devices from the plurality of end user devices 102 to which notifications are to be sent,
- identify the operating system of each of the plurality of end user devices 102 and
- send push notification to the user push notification module 102D of the identified devices from the plurality of end user devices 102.

The user authentication module 102E is configured to facilitate the log-in of the end users of the organization, using authorization information provided to each of the end users by the organization. The user authentication module 102E is further configured to send the authorization information entered by the end users into each of the plurality of end user devices 102 to the server authentication module 104E. In an embodiment, the server authentication module 104E is configured to:
- interface with the active directory 110 using internet protocols,
- retrieve the authorization information of the plurality of end user devices 102, pre-stored in the active directory 110,
- verify the authorization information corresponding to each of the plurality of end user devices 102,
- identify whether each of the plurality of end user devices 102 is registered to an employee, CEO or the Department head of one of the departments, based on their authorization information, and
- provide a role identifier to each of the plurality of end user devices 102.

In yet another embodiment, based on the role identifier assigned to each of the plurality of end user devices 102 by the server authentication module 104E:
- the analytics module 104C is configured to filter datasets to be sent to the dashboard 102C of each of the plurality of end user devices 102,
- the server push notification module 104D is configured to selectively send notifications to the user push notification module 102D, and
- the server engagement platform 104B is configured to provide only authorized functionalities to the user engagement platform 102B of each of the plurality of end user devices 102.

In another embodiment, the at least one data server 104 includes a visibility filter which cooperates with the server authentication module 104E and is connected between the user engagement platform 102B and the server engagement platform 104B. The visibility filter contains predefined rules for data privacy within the organization. The visibility filter further provides the end users of the organization with options for selecting from a plurality of privacy settings for the data posted from the plurality of end user devices 102. The visibility filter may either
- receive data from the user engagement platform 102B and mark the data with a default visibility flag using the predefined rules and depending upon the role identifier of each device of the plurality of end user devices 102, or
- receive data from the user engagement platform 102B and mark the data with a visibility flag corresponding to the privacy setting chosen by each of the plurality of end user devices 102 for the received data.

In an exemplary embodiment, the visibility filter inter-alia provides the following privacy settings:
- questions posted by the employees of the organization are marked with a default restricted visibility flag which restricts viewing by any other end user of the organization until the question is answered;
- questions posted by the employees of the organization may be marked with visibility flags selected (by the employees posting the question) from the group comprising:
  i. public visibility flag (allowing answers to be visible publicly),
  ii. partial visibility flag (allowing answers to be visible only to the relevant department and the employees listed under the relevant department), and
  iii. private visibility flag (restricting answers to be visible only to the employee posting the question);
- questions redirected by the CEO to the relevant department (heads) of the organization may be marked with visibility flags selected (by the CEO) from the group comprising:
  i. public visibility flag (allowing the redirected question to be visible publicly),
  ii. a first partial visibility flag (allowing answers to be visible only to the relevant departments of the organization and not the employees listed under the relevant department),
  iii. a second partial visibility flag (allowing answers to be visible only to the relevant department and the employees listed under the relevant department),
  iv. a third partial visibility flag (allowing answers to be visible only to all the departments of the organization and none of the employees), and
  v. private visibility flag (restricting answers to be visible only to the employee posting the question); and
- questions answered may be marked with visibility flags selected (by the CEO or the redirected department) from the group comprising:
  i. public visibility flag (allowing answers to be visible publicly),
  ii. partial visibility flag (allowing answers to be visible only to the relevant department and the employees listed under the relevant department), and iii. private visibility flag (restricting answers to be visible only to the employee posting the question).

The visibility flags selected by the department (heads) while answering the questions overrule the visibility flags selected by the employees. Moreover, the visibility flags selected by the CEO are final.

In an embodiment, the adaptive learning system 108 is optimized and automated, and includes a comparator, a decision making unit and a recommendation unit (not shown in Figures). The adaptive learning system 108 is inter-alia configured to receive at least one query of the moderated information. The adaptive learning system 108 is further configured to request the at least one data server 104 to retrieve at least one query of the processed information stored in the at least one repository 112. The comparator is configured to compare the at least one query of the moderated information and the at least one query of the processed information. The decision making unit is configured to cooperate with the comparator to receive the result of the comparison and decide response to be given based on the result of the comparison. The recommendation unit cooperates with the decision making unit to receive a decided response and is configured to provide the recommendation signal to the at least one data server 104, based on the decided response. In one embodiment, the recommendation signal includes a recommended response that is configured to prevent contradictory responses to the at least one query of the moderated information.

In an embodiment, the adaptive learning system 108 is also configured to provide a sentiment analysis of the data received from the plurality of end user devices 102. In another embodiment, the adaptive learning system 108 is a closed loop data processing system based on at least one of fuzzy logic and neural networks. In an alternative embodiment, the at least one data server 104 includes an inbuilt adaptive learning system.

In one embodiment, the at least one data server 104 includes a translator (not shown in the Figures), configured to translate data received from the plurality of end user devices 102 between a plurality of languages.

Figure 2:
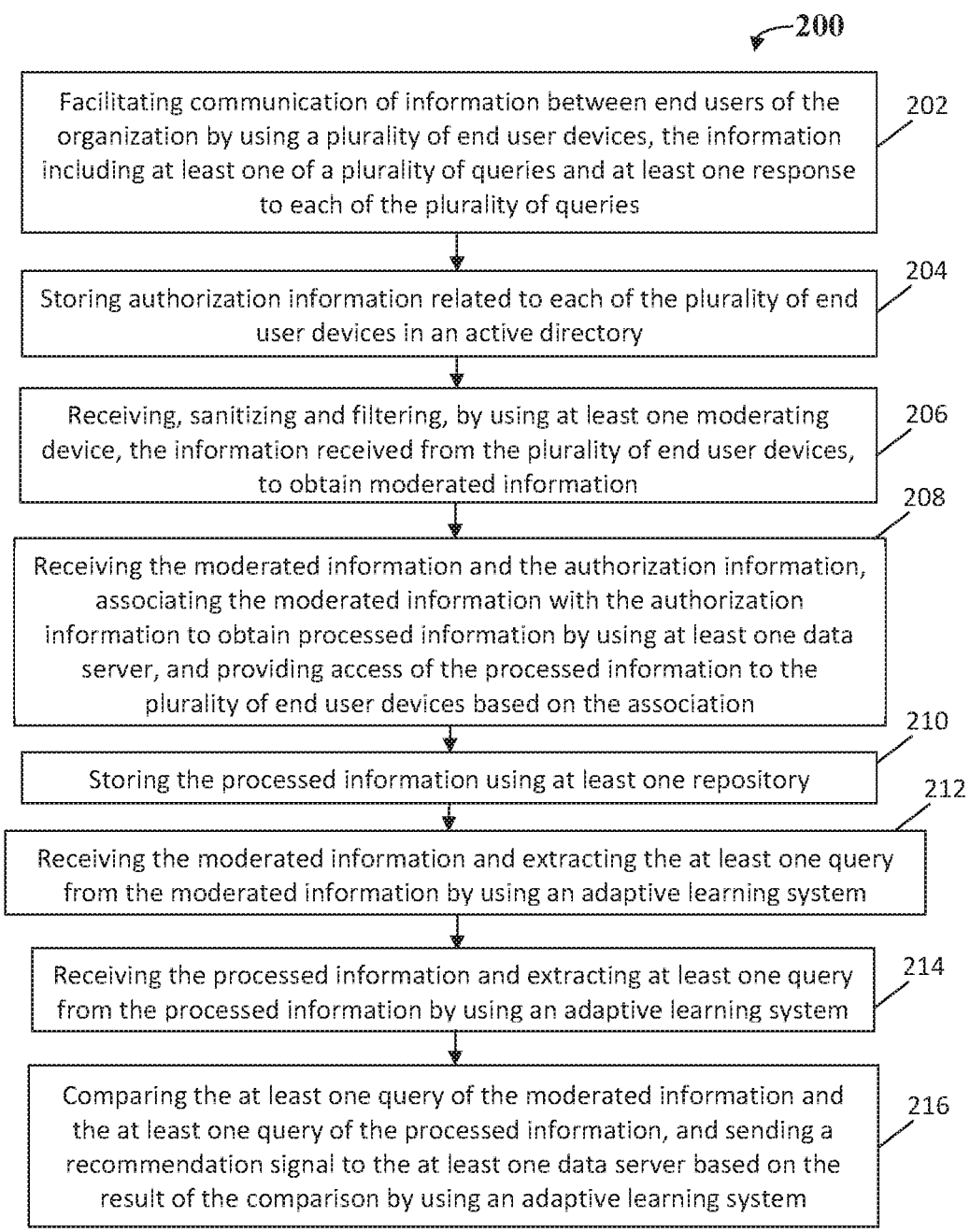
FIG. 2 illustrates a flow diagram depicting a method of direct communication and engagement, in accordance with one embodiment of the present disclosure.

FIG. 2 illustrates a flow diagram depicting a method 200 of direct communication and engagement within an organization (hereinafter referred to as method 200) in accordance with one embodiment of the present disclosure. The method 200 includes a step of facilitating communication of information between end users of the organization by using a plurality of end user devices, wherein the information includes at least one of a plurality of queries and at least one response to each of the plurality of queries (202). In one embodiment, the plurality of end user devices 102 facilitate the step of communication of information between the end users. The method 200 also includes steps of storing authorization information related to each of the plurality of end user devices in the active directory 110 (204), receiving, sanitizing and filtering, by using the at least one moderating device 106, the information received from the plurality of end user devices, to obtain moderated information (206), and receiving the moderated information and the authorization information, associating the moderated information with the authorization information to obtain processed information by using the at least one data server 104, and providing access of the processed information to the plurality of end user devices 102 based on the association (208). The method 200 further includes steps of storing the processed information using the at least one repository 112 (210), receiving the moderated information and extracting the at least one query from the moderated information by using the adaptive learning system 108 (212), receiving the processed information and extracting at least one query from the processed information by using the adaptive learning system 108 (214), and comparing the at least one query of the moderated information and the at least one query of the processed information, and sending a recommendation signal to the at least one data server 104 based on the result of the comparison by using the adaptive learning system 108 (216).

Figure 3:
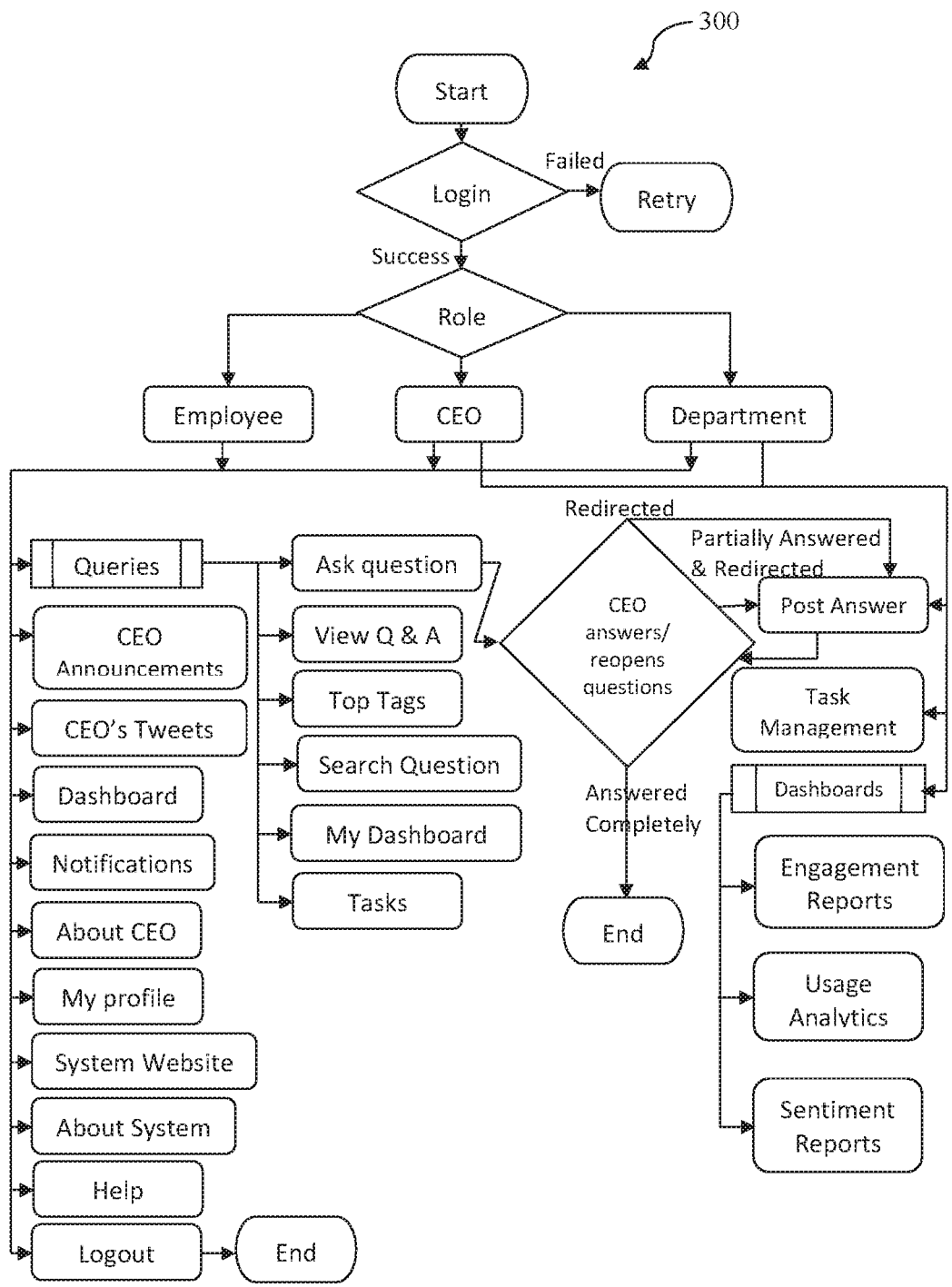
FIG. 3 illustrates a flow diagram depicting a method of direct communication and engagement, in accordance with another embodiment of the present disclosure.

FIG. 3 illustrates a flow diagram depicting a method 300 of direct communication and engagement within an organization (hereinafter referred to as method 300) in accordance with another embodiment of the present disclosure. The method 300 may be described in the general context of computer executable instructions. Generally, computer executable instructions may include routines, programs, objects, components, and modules. The method 300 may be implemented in any suitable hardware, software, firmware, or combination thereof. The system 100 is initiated or launched and the end user attempts to log-in to the system 100. The user gets a predetermined number of retries for logging-in to the system in case of failed attempts. After successful log-in, the system 100 determines the role of the end user in the system and assigns a role identifier to the end users. The role identifiers for an organization may include Employee, CEO, and Department. A plurality of functionalities, corresponding to the role identifier of the end user, is displayed for the end user to select.

The plurality of functionalities common to all end-user roles may include Queries, CEO's Tweets, CEO Announcements, My Dashboard, Notifications, About CEO, My Profile, System Website, About System, Help, and Log-out. In an embodiment, the MyDashboard functionality may further comprise sub-functionalities including MyQuestions, MyComments, MyLikes, Trending Topics, Top Department, Leader-board, Tops Questions, Top Likes and Top Comments.

If the employee selects the Queries functionality, the plurality of operations is displayed may include Ask Question, View Q & A, Top Tags, and Search Questions. If the employee asks a question, the same is sent to a moderating device, already logged-in to the system. The moderating device checks and sanitizes the queries before sending the same to the CEO of the organization.

If the CEO selects the Queries functionality, the plurality of operations is displayed may include Answer Question/Redirect Question, View Q & A, Top Tags, Search Questions, View Dashboards and View Tasks. If the CEO selects Answer Question/Redirect Question, the CEO has the option of answering any of the questions posted by the employees of the organization (and duly reviewed by the moderating device) or redirecting the same to the department. The CEO has the additional option of partially answering the question and redirecting the rest to be answered by the relevant department. The CEO can also create a task and assign it to relevant a department.

If the Department (Head) selects the Queries functionality, the plurality of operations is displayed may include Answer Question, View Q & A, Top Tags, Search Questions, View Dashboards and manage tasks. If the Department (Head) selects Answer Question, the Department (Head) can answer any of the questions that are already answered by the CEO of the organization or answer questions redirected from the CEO. Additionally, departments can create tasks for actionable questions along with due date and self-assign to themselves. In such cases, the departments need to close these tasks after completion.

Additionally, a dashboard functionality is provided to the CEO and the Department (Head) of the organization. The dashboard functionality has further sub-functionalities including engagement reports, sentiment reports and usage analytics. In an embodiment, the engagement reports may have further sub-functionalities including Trending Topics, Top Department, Leader-board, Tops Questions, Top Likes and Top Comments. The reports and analytics may be region wise, department wise and gender wise. Moreover, the CEO is also provided with the functionality of making announcements and expressing views by means of both text and media.

TECHNICAL ADVANCEMENTS

The present disclosure described herein above has several technical advantages including, but not limited to, the realization of a system and a method of direct communication and engagement within an organization which:
  enables the CEO and the Department (Heads) to answer the queries of its employees, and
  ensures easy exchange of information and ideas within the organization.

The embodiments hereinabove and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system for direct communication and engagement within an organization, said system comprising:
  i. a plurality of end user devices configured to facilitate communication of information between end users of said organization, said information including at least one of a plurality of queries and at least one response to each of said plurality of queries, wherein each query, posted through an end user device, is assigned with a visibility flag selected from a group comprising a public visibility flag, a partial visibility flag, and a private visibility flag;
  ii. an active directory configured to store authorization information related to each of said plurality of end user devices;
  iii. a digital signal processor configured to filter said information to obtain moderated information, using at least one filtering technique, upon receipt of said information from said plurality of end user devices, indicating whether said information is allowed to be displayed on other end user devices of said plurality of end user devices, and wherein said information is filtered based on sentiment analysis;
  iv. at least one data server cooperating with said digital signal processor and said active directory to receive said moderated information and said authorization information respectively, said at least one data server configured to associate said moderated information with said authorization information to obtain processed information, and provide access of said processed information to said plurality of end user devices, based on the associated authorization information, when said information is displayed on said other end user devices;
  v. at least one repository cooperating with said at least one data server and configured to store said processed information; and
  vi. an adaptive learning system cooperating with said at least one data server, and said at least one repository, and configured to
    receive said moderated information from said at least one data server, and extract said at least one query from said moderated information,
    receive said processed information from said at least one repository and extract at least one query from said processed information,
    compare said at least one query of said moderated information and said at least one query of said processed information, and
    based on the result of said comparison, automatically identify and send a recommendation signal including a recommended response, of said at least one query, to said at least one data server thereby preventing contradictory responses to the at least one query,
  wherein said adaptive learning system is a closed loop data processing system based on at least one of fuzzy logic and neural networks.

2. The system as claimed in claim 1, wherein said plurality of end user devices are selected from a group of electronic communication devices including personal computers, PDAs, mobile tablets, smart phones, and the like.

3. The system as claimed in claim 1, wherein each of said plurality of end user devices is configured to interact with said at least one data server over at least one network.

4. The system as claimed in claim 1, wherein
  each of said plurality of end user devices includes a first processor, a user media module, a user engagement platform, a dashboard, a user push notification module, and a user authentication module, and
  said at least one data server includes a second processor, a server media module, a server engagement platform, an analytics module, a server push notification module, and a server authentication module.

5. The system as claimed in claim 4, wherein said second processor is configured to execute a set of computer programmable instructions which when executed cause said second processor to display media content, including a plurality of audio formats, a plurality of video formats, and a plurality of graphic/image formats, received over a content delivery network (CDN).

6. The system as claimed in claim 5, wherein said content delivery network (CDN) provides content repositories, delivery services, security of content, and smart streaming based on internet bandwidth and types of devices.

7. The system as claimed in claim 4, wherein said server engagement platform is configured to interact with said user engagement platform to provide functionalities which include
- posting questions and answers by the means of text/typed communication, and/or voice message, and/or images,
- liking questions and answers,
- commenting on questions and answers,
- redirecting questions to departments,
- re-opening questions, task management and
- providing dashboard computations.

8. The system as claimed in claim 4, wherein said second processor is configured to execute a set of computer programmable instructions which when executed cause said second processor to
- publish server interfaces for the dashboard,
- aggregate and analyze for engagement, usage and sentiment of, the data received from said server engagement platform and the server media module, and
- create datasets to be sent to the dashboard of each of the plurality of end user devices;

and
wherein said dashboard is configured to interface with said at least one data server to fetch data to be displayed on said user engagement platform.

9. The system as claimed in claim 4, which includes cloud notification services (CNS) configured to provide an interface between said user push notification module and said server push notification module, wherein said cloud notification services (CNS) include Apple Push Notification Service (APNS) and Google Cloud Messaging (GCM).

10. The system as claimed in claim 4, wherein said first processor is configured to execute a set of computer programmable instructions which when executed cause said first processor to:
- receive a device token from the cloud notification services (CNS),
- send the token to said server push notification module along with a user ID to bind said plurality of end user devices, and
- handle multiple tasks to be performed on receipt of a push notification.

11. The system as claimed in claim 4, wherein said second processor is configured to execute a set of computer programmable instructions which when executed cause said second processor to:
- identify devices from said plurality of end user devices to which notifications are to be sent,
- identify the operating system of each of said plurality of end user devices, and
- send a push notification to said user push notification module of said identified devices.

12. The system as claimed in claim 4, wherein said first processor is configured to execute a set of computer programmable instructions which when executed cause said first processor to facilitate log-in of said end users of said organization, using authorization information provided to each of said end users by said organization, and send the authorization information, entered by said end users into each of said plurality of end user devices, to said server authentication module.

13. The system as claimed in claim 4, wherein said second processor is configured to execute a set of computer programmable instructions which when executed cause said second processor to:
- interface with said active directory using internet protocols,
- retrieve said authorization information of said plurality of end user devices from said active directory,
- verify said authorization information corresponding to each of said plurality of end user devices,
- identify whether each of said plurality of end user devices is registered to an employee, CEO or a department head of one of the departments, based on their authorization information, and
- provide a role identifier to each of the plurality of end user devices.

14. The system as claimed in claim 13, wherein based on said role identifier,
- said set of computer programmable instructions when executed cause said second processor to filter datasets to be sent to said dashboard of each of said plurality of end user devices,
- said set of computer programmable instructions when executed cause said second processor to selectively send notifications to said user push notification module, and
- said set of computer programmable instructions when executed cause said second processor to provide only authorized functionalities to said user engagement platform of each of the plurality of end user devices.

15. The system as claimed in claim 4, wherein said at least one data server includes:
- a visibility filter cooperating with said server authentication module and connected between said user engagement platform and said server engagement platform, said visibility filter configured to include predefined rules for data privacy within said organization, and further configured to provide options to said end users for selecting from a plurality of privacy settings for the data posted from said plurality of end user devices; and
- a translator configured to translate data received from said plurality of end user devices, in a plurality of languages.

16. The system as claimed in claim 15, wherein said visibility filter is configured to receive data from said user engagement platform and mark said received data with a default visibility flag using said predefined rules and said role identifier of each of said plurality of end user devices.

17. The system as claimed in claim 15, wherein said visibility filter is configured to receive data from said user engagement platform and mark said received data with a visibility flag corresponding to a privacy setting chosen, from said plurality of privacy settings, by each of said plurality of end user devices.

18. A method for direct communication and engagement within an organization, said method comprising the following:
- facilitating communication of information between end users of said organization by using a plurality of end user devices, said information including at least one of a plurality of queries and at least one response to each of said plurality of queries, wherein each query, posted through an end user device is assigned with a visibility flag selected from a group comprising a public visibility flag, a partial visibility flag, and a private visibility flag;

storing authorization information related to each of said plurality of end user devices in an active directory;

filtering, by using at least one data filtering technique implemented by a digital signal processor, said information received from said plurality of end user devices, to obtain moderated information, upon receipt of said information from said plurality of end user devices, indicating whether said information is allowed to be displayed on other end user devices of said plurality of end user devices, and wherein said information is filtered based on sentiment analysis;

receiving said moderated information and said authorization information, associating said moderated information with said authorization information to obtain processed information by using at least one data server, and providing access of said processed information to said plurality of end user devices based on said associated authorization information, when said information is displayed on said other end user devices;

storing said processed information using at least one repository;

receiving said moderated information and extracting said at least one query from said moderated information by using an adaptive learning system;

receiving said processed information and extracting at least one query from said processed information by using an adaptive learning system; and comparing said at least one query of said moderated information and said at least one query of said processed information, and sending a recommendation signal including a recommended response, of said at least one query, to said at least one data server based on the result of said comparison by using an adaptive learning system thereby preventing contradictory responses to the at least one query, wherein said adaptive learning system is a closed loop data processing system based on at least one of fuzzy logic and neural networks.

\* \* \* \* \*